United States Patent
Han et al.

(10) Patent No.: US 11,356,533 B2
(45) Date of Patent: *Jun. 7, 2022

(54) FACILITATION OF EFFICIENT WEB SITE PAGE LOADING

(71) Applicant: AT&T Intellectual Property I, L.P., Atlanta, GA (US)

(72) Inventors: Bo Han, Bridgewater, NJ (US); Lusheng Ji, Randolph, NJ (US); Shuai Hao, Hillsborough, NJ (US); Feng Qian, Bloomington, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/120,558

(22) Filed: Sep. 4, 2018

(65) Prior Publication Data
US 2018/0375962 A1    Dec. 27, 2018

Related U.S. Application Data

(63) Continuation of application No. 14/815,280, filed on Jul. 31, 2015, now Pat. No. 10,084,884.

(51) Int. Cl.
*H04L 67/63* (2022.01)
*H04L 67/568* (2022.01)
(Continued)

(52) U.S. Cl.
CPC ........ *H04L 67/327* (2013.01); *G06F 16/9574* (2019.01); *H04L 67/2842* (2013.01); *H04L 67/2847* (2013.01); *H04L 67/02* (2013.01)

(58) Field of Classification Search
CPC . H04L 67/42; H04L 65/4076; H04L 12/1881; H04L 67/10; H04L 69/04;
(Continued)

(56) References Cited

U.S. PATENT DOCUMENTS 6,098,096 A    8/2000  Tsirigotis et al.
7,043,524 B2   5/2006  Shah et al.
(Continued)

FOREIGN PATENT DOCUMENTS

| GB | 2517060 A     | 2/2015 |
| WO | 03/032201 A1  | 4/2003 |
| WO | 2007/009255 A1 | 1/2007 |

OTHER PUBLICATIONS

"Open Channel", 2015, Seven Networks, Accessed at http://www.seven.com/products.traffic_optimization, Retrieved on Jul. 15, 2015, 2 pages.
(Continued)

*Primary Examiner* — Djenane M Bayard
(74) *Attorney, Agent, or Firm* — Amin, Turocy & Watson, LLP

(57) ABSTRACT

Utilizing resource data hints and resource data pushes can generate a more efficient web site page load. Utilizing resource data hints and resource data pushes effectively can reduce web site load times and conserve data resources. Leveraging a data cache and a data structure associated with the web site can increase communication efficiencies between a client device and a server device, thereby determining and implementing the most efficient communication patterns to conserve data resources.

20 Claims, 12 Drawing Sheets

(51) Int. Cl.
*G06F 16/957* (2019.01)
*H04L 67/5681* (2022.01)
*H04L 67/02* (2022.01)

(58) Field of Classification Search
CPC . H04L 65/60; H04L 12/1859; H04L 12/1863; H04L 12/1886; H04L 45/7453; H04L 47/70; H04L 69/22; H04L 65/80; H04L 65/4069; H04L 67/02; H04L 65/00; H04L 65/4092; H04L 65/604; H04L 67/2814; H04L 67/2823; H04L 2209/76; H04L 67/1078; H04L 67/22; H04L 43/06; H04L 65/4084; H04L 67/26; H04L 63/20; H04L 51/04; H04L 65/403; H04L 65/607; H04L 65/1083; H04L 51/10; H04L 63/08; H04L 63/102; H04L 9/32; H04L 47/2416; H04L 65/605; H04L 67/18; H04L 65/1016; H04L 65/1089; H04L 65/4015; H04L 65/608; H04L 67/306; H04L 47/10; H04L 65/1006; H04L 65/1063; H04L 65/1069; H04L 65/602; H04L 12/1822; H04L 29/06027; H04L 45/22; H04L 47/12; H04L 47/30; H04L 47/34; H04L 49/9094; H04L 51/046; H04L 51/32; H04L 63/0815; H04L 63/107; H04L 65/1093; H04L 67/1095; H04L 67/32; H04L 12/1827; H04L 12/6418; H04L 29/06; H04L 45/02; H04L 45/10; H04L 45/34; H04L 45/50; H04L 45/62; H04L 67/2842; H04L 67/289; H04L 67/28; H04L 67/1046; H04L 67/1048; H04L 67/2852; H04L 67/1097; H04L 43/16; H04L 67/04; H04L 67/142; H04L 69/14; H04L 67/14; H04L 67/1002; H04L 67/104; H04L 67/1068; H04L 67/108; H04L 63/0428; H04L 67/2847; H04L 69/329; H04L 67/1008; H04L 43/0817; G06F 17/30902; G06F 17/3089; G06F 17/30861; G06F 17/30864; G06F 17/30997; G06F 2212/60; G06F 17/30876; G06F 2212/1016; G06F 2212/604; G06F 3/0664; G06F 12/0862; G06F 17/30345
See application file for complete search history.

(56) References Cited

U.S. PATENT DOCUMENTS

| | | | |
|---|---|---|---|
| 7,058,691 B1 | 6/2006 | Yu et al. | |
| 7,130,890 B1 | 10/2006 | Kumar et al. | |
| 7,418,518 B2 | 8/2008 | Grove et al. | |
| 7,437,438 B2 | 10/2008 | Mogul et al. | |
| 8,069,225 B2 | 11/2011 | McCanne et al. | |
| 8,438,298 B2 | 5/2013 | Arai et al. | |
| 8,677,018 B2 | 3/2014 | Roskind | |
| 8,762,490 B1 | 6/2014 | Roskind et al. | |
| 8,930,548 B2 | 1/2015 | Hallem et al. | |
| 8,948,042 B2 | 2/2015 | Mulcahy et al. | |
| 8,966,053 B2 | 2/2015 | Sebastian | |
| 9,037,638 B1 | 5/2015 | Lepeska et al. | |
| 2003/0004998 A1* | 1/2003 | Datta | G06F 16/9574 715/234 |
| 2003/0069925 A1 | 4/2003 | Weaver et al. | |
| 2003/0069926 A1 | 4/2003 | Weaver et al. | |
| 2004/0088375 A1* | 5/2004 | Sethi | G06F 16/9574 709/218 |
| 2007/0255754 A1 | 11/2007 | Gheel | |
| 2008/0229025 A1 | 9/2008 | Plamondon | |
| 2009/0112975 A1 | 4/2009 | Beckman et al. | |
| 2010/0146415 A1 | 6/2010 | Lepeska | |
| 2010/0235329 A1* | 9/2010 | Koren | H04L 67/2847 707/687 |
| 2010/0281112 A1 | 11/2010 | Plamondon | |
| 2011/0029641 A1* | 2/2011 | Fainberg | G06F 12/0862 709/219 |
| 2012/0131095 A1 | 5/2012 | Luna et al. | |
| 2012/0317187 A1* | 12/2012 | Fredricksen | H04L 29/08729 709/203 |
| 2013/0226992 A1 | 8/2013 | Bapst et al. | |
| 2013/0232399 A1 | 9/2013 | Anick et al. | |
| 2014/0215001 A1* | 7/2014 | Tucek | H04W 4/18 709/213 |
| 2014/0379840 A1* | 12/2014 | Dao | H04L 67/2847 709/213 |
| 2015/0019676 A1 | 1/2015 | Fablet et al. | |
| 2015/0023360 A1 | 1/2015 | Wills et al. | |
| 2016/0028646 A1* | 1/2016 | Fablet | H04L 47/80 709/226 |
| 2016/0105374 A1* | 4/2016 | Thackray | H04L 67/02 709/226 |

OTHER PUBLICATIONS

Sun, et al., "Improving Data Access Performance with Server Push Architecture", Parallel and Distributed Processing Symposium (IPDPS), Jan. 2007, IEEE, Accessed at http://www.researchgate.net/profile/Surendra_Byna/publication/220953076_Improving_Data_Access_Performance_with_Server_Push_Architecture/links/0912f509811d62cff1000000.pdf, Retrieved on Jul. 15, 2015, 6 pages.

Belshe, et al., "Hypertext Transfer Protocol Version 2 (HTTP/2)", 2015, IETF Trust, Accessed at https://http2.github.io/http2-spec/, Retrieved on Jul. 15, 2015, 63 Pages.

Irani, "Google Releases GRPC to Speed Up HTTP/2 Support in Applications", ProgrammableWeb, Feb. 2015, Accessed at http://www.programmableweb.com/news/google-releases-grpc-to-speed-http2supportapplications/2015/02/27, Retrieved on Jul. 15, 2015, 2 Pages.

International Search Report and Written Opinion for International Application No. PCT/US2016/033356 dated Aug. 23, 2016, 17 pages.

Non-Final Office Action received for U.S. Appl. No. 14/815,280 dated Apr. 6, 2017, 38 pages.

Final Office Action received for U.S. Appl. No. 14/815,280 dated Oct. 16, 2017, 35 pages.

Non-Final Office Action received for U.S. Appl. No. 14/815,280 dated Jan. 24, 2018, 40 pages.

* cited by examiner

FACILITATION OF EFFICIENT WEB SITE PAGE LOADING

RELATED APPLICATION

The subject patent application is a continuation of, and claims priority to, U.S. patent application Ser. No. 14/815,280, filed Jul. 31, 2015, and entitled "FACILITATION OF EFFICIENT WEB SITE PAGE LOADING," the entirety of which application is hereby incorporated by reference herein.

TECHNICAL FIELD

This disclosure relates generally to facilitating efficient web site page loading. More specifically, this disclosure relates to page resource data requests and page resource data pushes to facilitate web site page loading.

BACKGROUND

Hypertext transfer protocol (HTTP) is an application protocol for distribute d collaborative, hypermedia information systems used to exchange or transfer hypertext. HTTP is the foundation of data communication for the World Wide Web. Hypertext is structured text that uses logical links (hyperlinks) between nodes containing text.

HTTP functions as a request-response protocol in the client-server computing model. A web browser, for example, may be the client and an application running on a computer hosting a web site may be the server. The client can submit an HTTP request message to the server. The server, which provides resources such as HTML files and other content, or performs other functions on behalf of the client, can return a response message to the client. The response message can contain completion status information about the request and can also contain requested content in its message body.

A web browser is an example of a user agent (UA). Other types of user agents include the indexing software used by search providers (web crawlers), voice browsers, mobile apps, and other software that accesses, consumes, or displays web content. HTTP is designed to permit intermediate network elements to improve or enable communications between clients and servers. High-traffic websites often benefit from web cache servers that deliver content on behalf of upstream servers to improve response time. Web browsers can cache previously accessed web resources and reuse them when possible to reduce network traffic. HTTP proxy servers at private network boundaries can facilitate communication for clients, without a globally routable address, by relaying messages with external servers.

HTTP resources are identified and located on a network by uniform resource identifiers (URIs)—or, more specifically, uniform resource locators (URLs)—using the HTTP or HTTPS URI schemes. URIs and hyperlinks in hypertext markup language (HTML) documents form webs of interlinked hypertext documents.

The above-described background relating to HTTP protocol is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
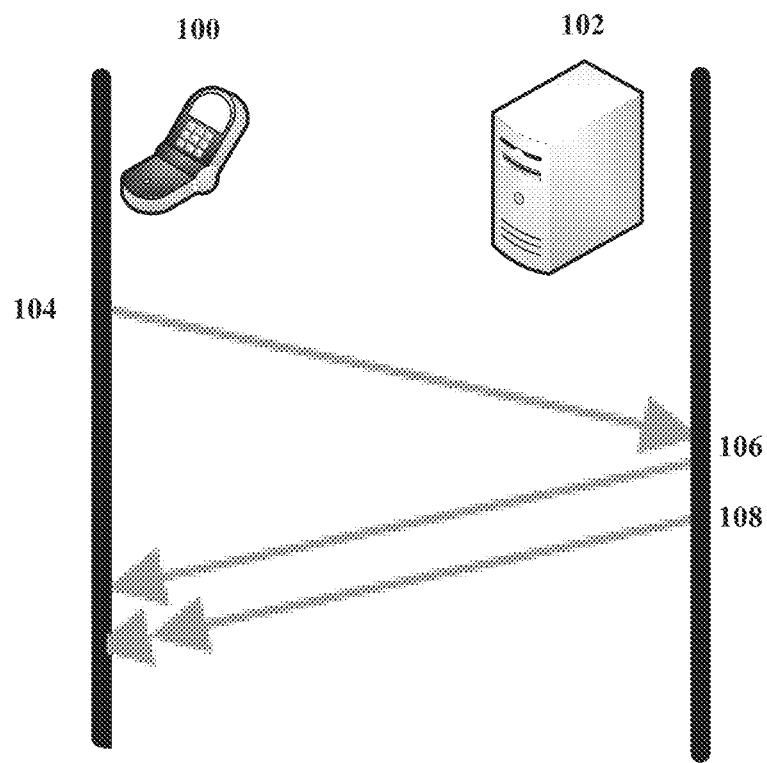
FIG. 1 illustrates an example wireless network comprising an HTTP server push according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional HTTP protocols, various embodiments are described herein to facilitate a reduced web site load time.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate a reduced web site load time. Facilitating a reduced web site page load time can be implemented in connection with any type of device with a connection to the communications network such as: a mobile handset, a computer, a handheld device, or the like.

Web pages/web sites can be rich and complex, especially for mobile versions. Thus, loading a web page can involve complex interactions between multiple entities including a network, a cache, a page parser, a JavaScript/CSS evaluator, and a rendering engine. Accordingly, numerous optimization techniques have been proposed to improve various aspects of web site page loading. For example, content delivery networks (CDNs) can be deployed to reduce network latency, pages can be rewritten to reduce a parsing time, multiplexing can be introduced to optimize transport-layer performance, and compact image formats can be used to reduce content sizes.

Despite these aforementioned techniques, a page load time (PLT) can still be high due to various reasons. When loading a web site page, the network transfer and local computation (HTML parsing, script evaluation, page rendering) are interleaved, due to the complex dependencies among web objects (i.e., resources). At the beginning of loading a page, a browser has no knowledge of what resources it will need. The page loading process therefore becomes a procedure of iteratively discovering, fetching, and consuming resources by expanding an initially unknown dependency.

Such an interleaved resource exploration pattern can degrade web performance and resource efficiency at various layers within cellular networks. At the radio layer, fetching data intermittently can make a device continuously occupy a high-power radio state and thus increase radio energy consumption. At the network layer, downloading resources in multiple round-trips can increase the page load time, in particular in cellular networks with moderate to high round-trip times (RTT) or high round-trip delay times (RTD). At the transport layer, a long idle gap can reset the congestion window and cause potential bandwidth under-utilization. At the application layer, fetching resources can block other activities (e.g., synchronous JavaScript blocks HTML parsing) and lengthen the critical path in the dependency graph.

The present disclosure can work over any type of network, including metered cellular networks with moderate to high latency and high radio energy consumption. It can comprise two phases: push and early fetch. In the push phase, a server (or proxy) can push several meta files, which contain resource URLs (i.e., hints) of the current and/or future pages that are to be requested by a client. In the early fetch phase, the client can request resources according to the meta file and batch the requests with the request of the page. Thus, the page together with all its resources can be downloaded in one round-trip. This decouples the network transfer and local computation, and breaks the complex "load-parse-load" dependencies among objects, leading to a reduced web site page load time.

The current disclosure proposes a cellular-friendly server push framework for HTTP/2 by explicitly providing a client with cacheable hints to facilitate early resource fetching, thus breaking network transfers and local computations. Specifically, when loading a page, a server can push hints (called meta files or meta data), which contain its own subpages resource lists to a client. The meta files can then be cached by the client. When the client requests a subpage with a cached meta file, it can then supplement resource fetching requests with the page request. Consequently, the whole page with its resources can be downloaded in one round-trip with little extra bandwidth overhead due to the small size of meta files.

The aforementioned can be integrated with HTTP/2 by strategically leveraging a server push feature. It can also be implemented in HTTP/1.1 where a push can be generated by add-ons such as WebSocket. Thus, it can be incrementally deployable with small changes to client browsers, and if deployed at proxies, remote server changes can be mitigated.

To reduce web site page load times, two approaches are proposed: server push and server hints. Server push can allow a server to preemptively send (i.e., push) resources to a client without requiring the client to request the resource. The underlying assumption is that the client will need the resource very shortly (e.g., after parsing an HTML page), thus pushing it in advance avoids a round-trip delay and reduces the web site page load time. A pushed resource can be cacheable so that it can be loaded from the local cache when the client needs it.

In HTTP/2, to push a resource, a server can first send a push promise frame on an existing client-initiated stream. The push promise frame has two purposes. First, it can notify the client that the server will create a new stream for pushing by including a stream identification (ID). Second, it can contain header information of the resource to be pushed. After sending the push promise frame, the server can initiate a new stream over which resource data can be transmitted.

Server push can effectively reduce the web site load time. However, it can be difficult for a server to determine what needs to be pushed. In particular, if a client already has an unexpired resource in its cache, then pushing it is wasteful, particularly in cellular networks where customers are charged by the amount of transferred bytes.

Server hints can provide a way for a server to notify a client of a resource that will be needed before it is discovered by the client. Unlike the server push, when using the server hints, the server does not send the actual resource data, but only its URL as a "hint". Therefore, the client only revalidates resources that are expired and requests resources that are not in the local cache. Server hints can utilize a link header to be standardized in HTML 5. The server can inject hints into a response header using the following HTML link:<url>;rel=prefetch [2] or link:<url>;rel=subresource [3] where the url is the resource URL. The browser can then collect (potentially multiple) embedded hints, and pre-fetch them.

Regarding the two methods above, link rel=prefetch can prefetch resources when the browser is idle. Consequently, the prefetching is given a low priority, and only happens after all regular resources in the current page are fetched and parsed. Therefore, this method can be suitable for prefetching resources of future pages. Link rel=subresource can have different semantics where fetching the hints can be given a high priority (i.e.: it can happen before any regular resource in the current page is fetched). This method can be suitable for early fetching resources of the current page.

Both methods address the client-side caching issue in server push. However, they both can have limitations. Link rel=prefetch can be difficult to use because prefetching happens when the browser is idle, and predicting which page the user will browse next can be difficult. Aggressively prefetching all resources in all subpages can waste traffic, whereas conservatively prefetching common objects in all subpages can limit the applicability of prefetching. Link rel=subresource can work for the current page since the hints are embedded in the response header of the current page that needs to be requested first. Thus, early fetching can incur an additional round-trip, which can last up to several hundred milliseconds in cellular networks.

Each page/site can also have a unique meta file. The meta file can have three parts: a head, a list of resources, and subpage IDs. The header can comprise a meta file ID (mID), an associated page URL, and an expiration time. The meta file ID can have one-to-one mappings with its pages, and can be generated by hashing the page URL. The meta file itself can be cacheable, with its own expiration time potentially differing from that of its associated page. The header can be followed by a list of resources that a client may need when fetching the page, which the meta file belongs to. Each entry of the resource can contain the resource URL, and optionally a weight and the resource's expiration time/eTag. URLs in the list can be properly ordered to observe the resource dependency (for local computation). Thus, the client can issue early fetching requests according to the order. The list of subpage mIDs can be pages, which users can navigate to from the current page. The subpage mIDs can be identified statically (by identifying HTML links) or statistically (e.g., by observing from the web server logs to capture dynamic navigations).

For each page, meta files/metadata can be propagated to clients in two pushes. First, upon the reception of a page request, a server can push the page's meta file. This can help a client to early-fetch resources in the current page. Second, when becoming idle (i.e., after delivering resources of the current page), the server can push the subpages' meta files. The traffic overhead of the push can be small given the small sizes of meta files. In addition, two measures can be employed to reduce the push size. First, a cap/limit can be applied on the number of pushed meta files by either the client (using a request header) or the server. For example, based on subpages' popularity, only the top-k meta files can be pushed. Second, the server does not need to push meta files that are already cached by the client. To facilitate this process, a lightweight cache hint and validation mechanism can be used to inform the server of the set of cached meta files.

Specifically, the client can embed a list or data structure into the page request. If the meta file of the current page does not exist, the list can be empty. Consequently, the server can do a full push of meta files of the current page and all its subpages unless a cap is set. Otherwise, the list can contain (mID, expiration time) pairs of the current page and subpages whose meta files are cached. Thus the server can (1) validate the meta files in the list and push updated versions if they are out-of-date, and (2) push meta files that belong to subpages but are not in the list. As a result, the client can have up-to-date meta files of the current page and its subpages.

Furthermore, the meta files can be leveraged by a client in several ways. The meta files can provide a manifest for early-fetching resources at the beginning of loading a page. The client can use a weight to facilitate a tradeoff between traffic volume and latency, by performing selective fetching. The weight can be a number denoting the probability that the resource will be needed by the client. For resources that are dynamically requested (e.g., by JavaScript), their weights can be less than one. Consequently, to reduce bandwidth consumption, the client can take a conservative approach by only fetching resources with higher weights. The client can also leverage an optional expiration time and eTag fields to conduct local cache validation for expired resources. Thus, network cache validation (e.g., using if-modified-since) can be avoided to further reduce web site page load time.

The present disclosure can also overcome the limitations of server hints. Compared to Link rel=prefetch, it can employ a more targeted early fetch. Instead of prefetching when the browser is idle, the present disclosure can delay the prefetch until requesting the actual page by explicitly associating resource lists (i.e., meta files) with pages in order to reduce unnecessary transfers. Consequently, the meta files can be made cacheable and reusable so the server does not need to attach the hints to every page's response. The aforementioned process can reduce additional round-trips for getting the hints, and make hint delivery more efficient by bundling multiple pages' hints. Combining the two server hint approaches into a unified framework can provide additional benefits such as selective fetching and local cache validation. Meta files can capture both intra-page metadata (i.e., resources in a page) and inter-page metadata (i.e., the connectivity among pages within a website), thus facilitating early resource fetching by making such information explicitly available to the client.

In one embodiment, described herein is a method comprising receiving first web site request data and cache data. Based on the comparison of the first web site request data and the cache data, determining the web site is cached by a mobile device and sending web site data to the mobile device. A server device can then receive second web site request data and send second web site data to the mobile device comprising resource data for another website.

According to another embodiment, a system can facilitate a reduction in web site page load time by receiving web site request data and metadata related to the web site. The system can then send other metadata based on a comparison of the web site request data and the metadata. The system can also receive other web site request data comprising a resource request prior to the system sending other web site data related to the other web site.

According to yet another embodiment, described herein is a computer readable medium that can perform the operations comprising receiving a first request for a first web site page and receiving a first metadata related to the first web site page. The system can send second metadata representing web site content for the first web site page and third metadata related to a second web site page to a mobile device. Thereafter, the system can receive a second request for a web site page and a third request for a resource prior to sending fourth metadata comprising resource data representing the resource.

These and other embodiments or implementations are described in more detail below with reference to the drawings.

Referring now to FIG. 1, illustrated is an example wireless network comprising an HTTP server push according to one or more embodiments. A client device 100 can send a web site page request 104 to a server device 102. The web site page request 104 can comprise page resource data for loading the page. The page resource data can be cacheable so that the page can be loaded from a local cache when the client device 100 needs it. The server device 102 can send a response 106 to the client device 100. The response 106 can comprise push data 108 related to the web site page.

To facilitate sending of the push data 108, the server device 102 can send a push promise frame on the existing web site page request 104 stream. The push promise stream can notify the client device 100 that the server device 102 can create a new stream for pushing data by including a new stream ID. The push promise frame can also comprise header data related to a resource to be pushed. After sending the push promise frame, the server device can initiate the new stream over which the push data 108 can be sent.

Figure 2:
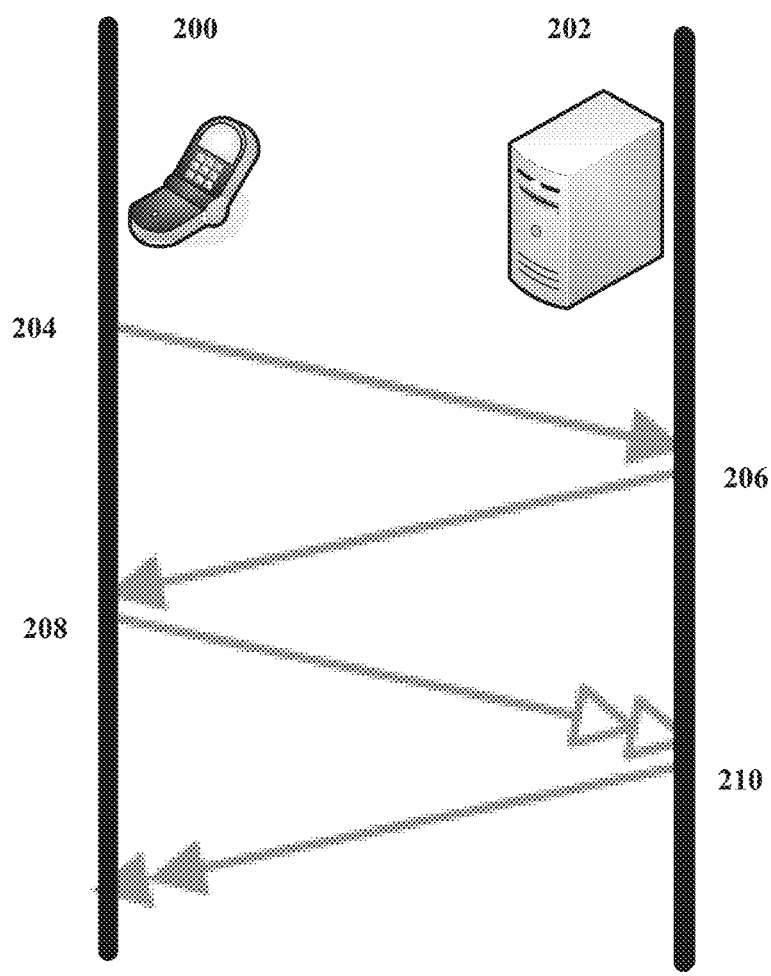
FIG. 2 illustrates an example wireless network comprising an HTTP server hint and sub-resources according to one or more embodiments.

Referring now to FIG. 2, illustrated is an example wireless network comprising an HTTP server hint and subresources according to one or more embodiments. A client device 200 can send a web site page request 204 to a server device 202. The web site page request 204 can comprise page resource data for loading the page. The page resource data can be cacheable so that the page can be loaded from a local cache when the client device 200 needs it. The server device 202 can send a response 206 to the client device 200.

Upon receiving the response 206, the client device 200 can send a prefetch request 208, for data related to a future web site page, to the server device 202. The prefetch request 208 can be performed when a browser of the client device 200 is idle or after other resources for the current web site have been fetched and parsed. In response to receiving the prefetch request 208, the server device can push prefetch data 210 to the client device 200.

Figure 3:
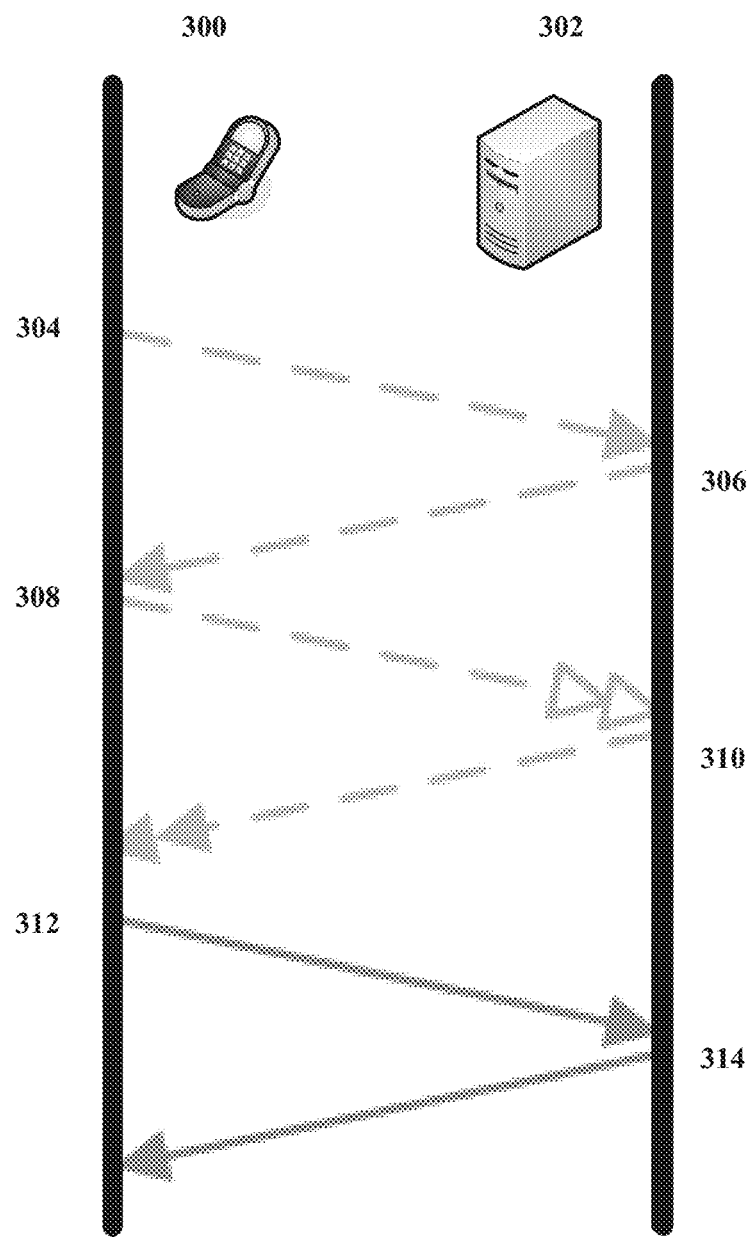
FIG. 3 illustrates an example wireless network comprising an HTTP server hint and a pre-fetch according to one or more embodiments.

Referring now to FIG. 3, illustrated is an example wireless network comprising an HTTP server hint and a pre-fetch according to one or more embodiments. A client device 300 can send a web site page request 304 to a server device 302. The web site page request 304 can comprise page resource data for loading the page. The page resource data can be cacheable so that the page can be loaded from a local cache when the client device 300 needs it. The server device 302 can send a response 306 to the client device 300.

Upon receiving the response 306, the client device 300 can send a prefetch request 308, for data related to a future web site, to the server 302. The prefetch request 308 can be performed when a browser of the client device 300 is idle or after other resources for the current web site have been fetched and parsed. In response to receiving the prefetch request 308, the server device can push prefetch data 310 to the client device 300.

After the previous web sites are loaded, the client device 300 can send another web site page request 312 to the server device 302. The other web site page request 312 can comprise page resource data for loading a current page. The page resource data can be cacheable so that the current page can be loaded from the local cache when the client device 300 needs it. The server device 302 can send another response 314 to the client device 300.

Figure 4:
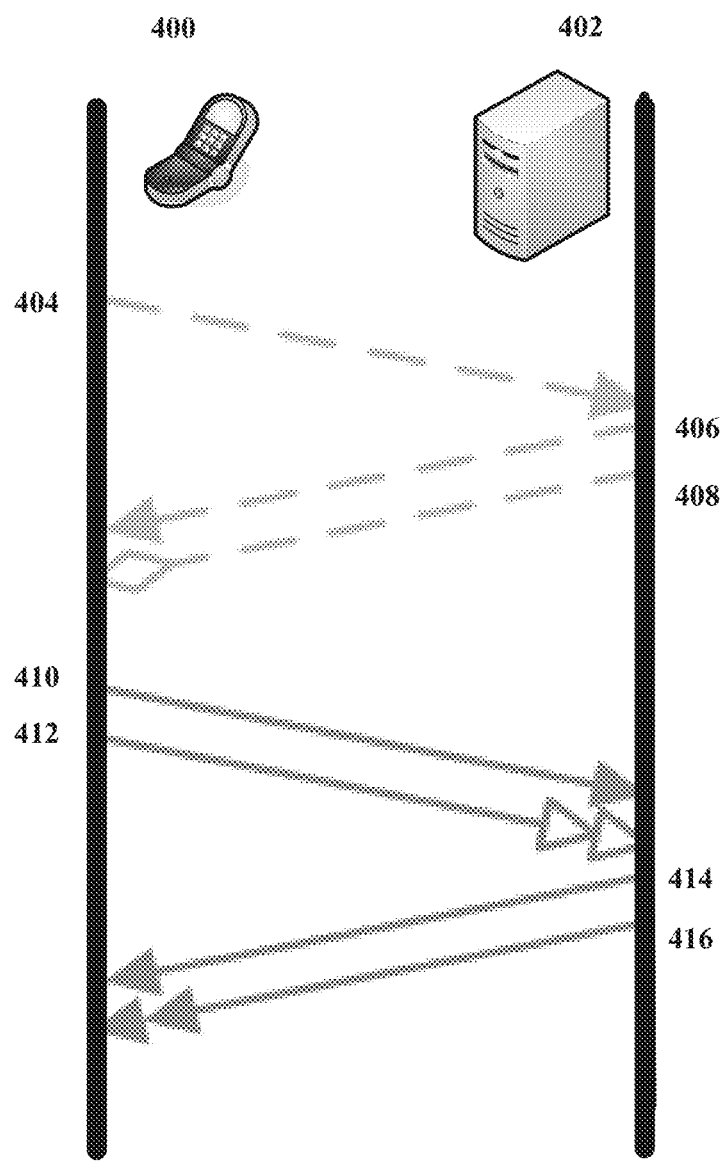
FIG. 4 illustrates an example wireless network comprising a prefetch, an HTTP server push, and metadata according to one or more embodiments.

Referring now to FIG. 4, illustrated is an example wireless network comprising a prefetch, an HTTP server push, and metadata according to one or more embodiments. A client device 400 can send a web site page request 404 to a server device 402. The web site page request 404 can comprise page resource data for loading the page. The page resource data can be cacheable so that the page can be loaded from a local cache when the client device 400 needs it. The server device 402 can send a response 406 to the client device 400. The response 406 can comprise a metadata push 408.

A cap or limit can be applied to the metadata push 408 by either the client device 400 or the server device 402. The limit on the metadata push 408 can also be based upon a popularity of subpages. Metadata can also be pushed based upon a cache hint and validation mechanism, which can be used to inform the server device 402 of cached metadata by the client device 400. The client device 400 can embed a list or data structure into the page request 404. If metadata related to a current page does not exist in the data structure, then the data structure can be considered to be empty. If the data structure is considered to be empty, then the server device 402 can send the response 406 comprising a full push of metadata 408 for the current page and its subpages unless a limit is set. If the data structure comprises data, then the data can be representative of IDs or expiration times of the current page and/or subpages whose metadata is cached.

The server device 402 can validate the metadata 408 in the data structure and push updated metadata if the metadata has expired. The server device 402 can also push metadata 408, which belongs to the subpages but are not included in the data structure. As a result, the client can have up-to-date metadata for the current page and its subpages.

Next, the client device 400 can send another page request 410 to the server device 402. The page request 410 can comprise a prefetch request 412, for data related to a future web site page, to the server device 402. Instead of the prefetch 416 being performed when a browser of the client device 400 is idle or after other resources for the current web site have been fetched and parsed, the prefetch 416 can be delayed until the page request 410 has been initiated. To reduce unnecessary transfer, the data structure of metadata can be associated with specific pages. In response to receiving the prefetch request 412, the server device can push prefetch data 416, within another response 414, to the client device 400. The metadata can be cacheable and reusable so that the server device 402 does not need to attach hints to every page's response.

Figure 5:
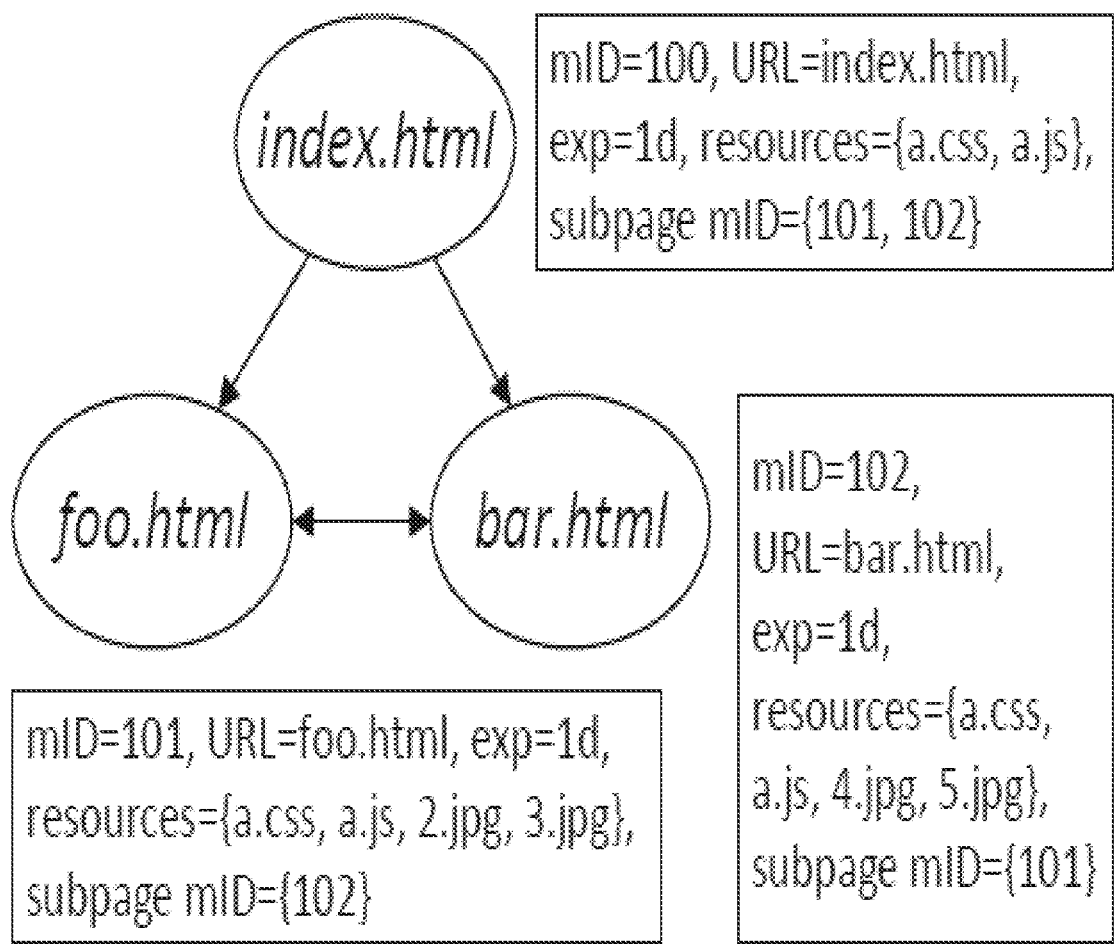
FIG. 5 illustrates example web sites and their respective metadata according to one or more embodiments.

Referring now to FIG. 5, illustrated are example web sites and their respective metadata according to one or more embodiments. Assuming a client device is requesting an index.html, there are two scenarios that can be considered. First, if the client has a cached copy of metadata represented by mID=100 and mID=101, it can let the server device know by embedding the mIDs and the expiration times ((100, exptime) and (101, exptime)) in the request. The server device can validate the metadata and then push the metadata related to mID=102 after the page is loaded because 102 is a subpage of 100 and is not currently cached. If the metadata associated with mID=100 is fresh (the client can know that beforehand), loading index.html can take one round-trip in the ideal case. Second, if the client device has an empty cache, the server device can push metadata associated with mID=100 immediately when the request is received so the client device can fetch a.css and a.js. After the page is loaded, the server device can push 101 and 102. The page load can take at least two round-trips, but the additional round-trip can be avoided for subsequent loadings of foo.html and bar.html.

Figure 6:
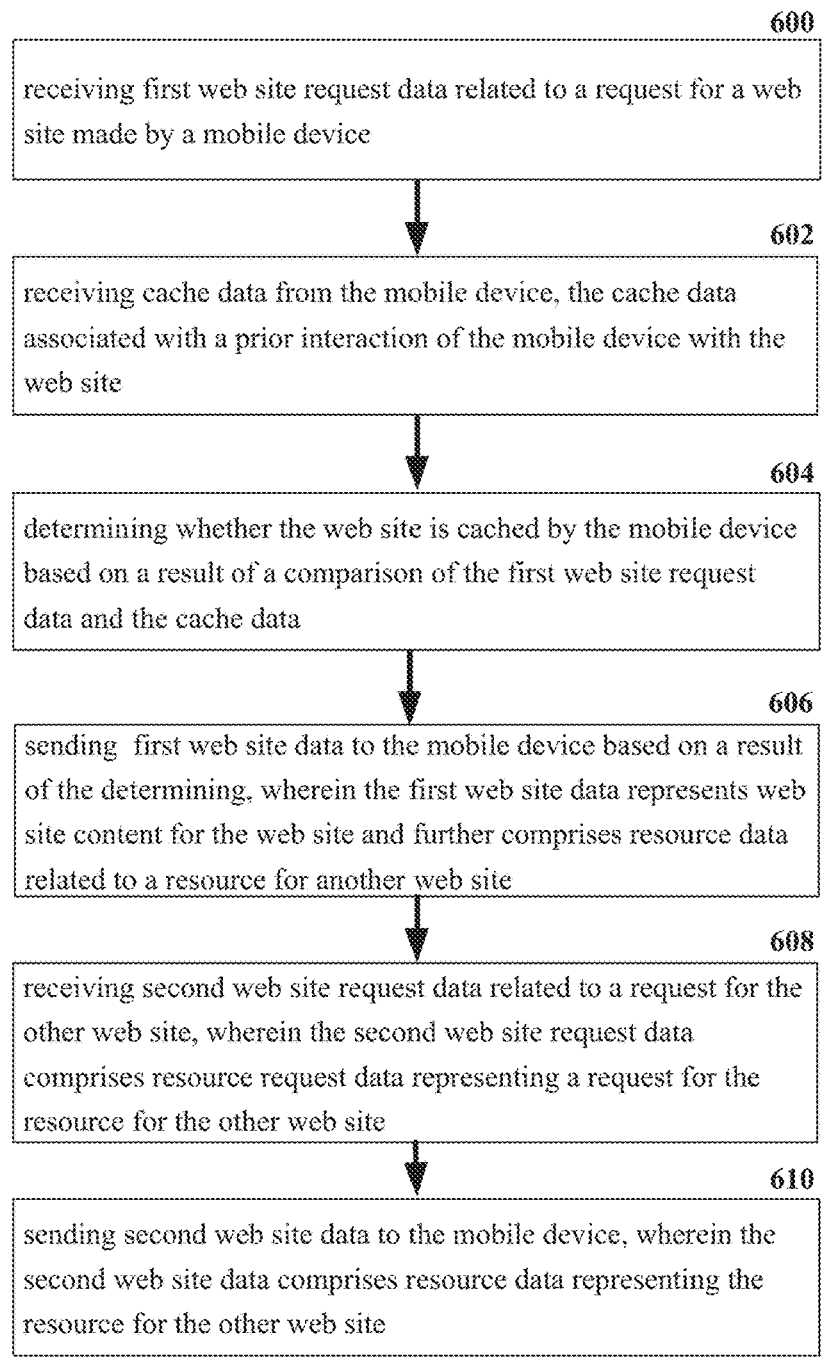
FIG. 6 illustrates an example schematic system block diagram of a client/server communication to reduce web site page load time according to one or more embodiments.

Referring now to FIG. 6, illustrated is an example schematic system block diagram of a client/server communication to reduce web site load time according to one or more embodiments. At element 600, first web site request data related to a request for a web site made by a mobile device can be received by a network device. At element 602 the server device can receive cache data from the mobile device, the cache data associated with a prior interaction of the mobile device with the website. The mobile device can also embed metadata, a list, or data structure related to the cache data into a web site page request. The network device can then determine whether the web site is cached by the mobile device based on a result of a comparison of the first web site request data and the cache data at element 604.

If metadata related to the web site does not exist in a data structure of the request, then the data structure can be considered to be empty. If the data structure is considered to be empty, then the network device can send a response comprising a full push of metadata for the web site, another web site page, and/or subpages unless a limit is set. If the data structure comprises metadata, then the metadata can be representative of IDs or expiration times of the web site and/or subpages whose metadata is cached. Thus, at element 606, first web site data can be sent to the mobile device based on a result of the determining, wherein the first web site data can represent web site content for the web site and can comprise resource data related to a resource for another web site.

At element 608, the network device can receive second web site request data related to a request for the other web site, wherein the second web site request data can comprise resource request data representing a request for the resource for the other web site. Additionally, the network device can send second web site data to the mobile device, wherein the second web site data can comprise resource data representing the resource for the other web site at element 610.

Figure 7:
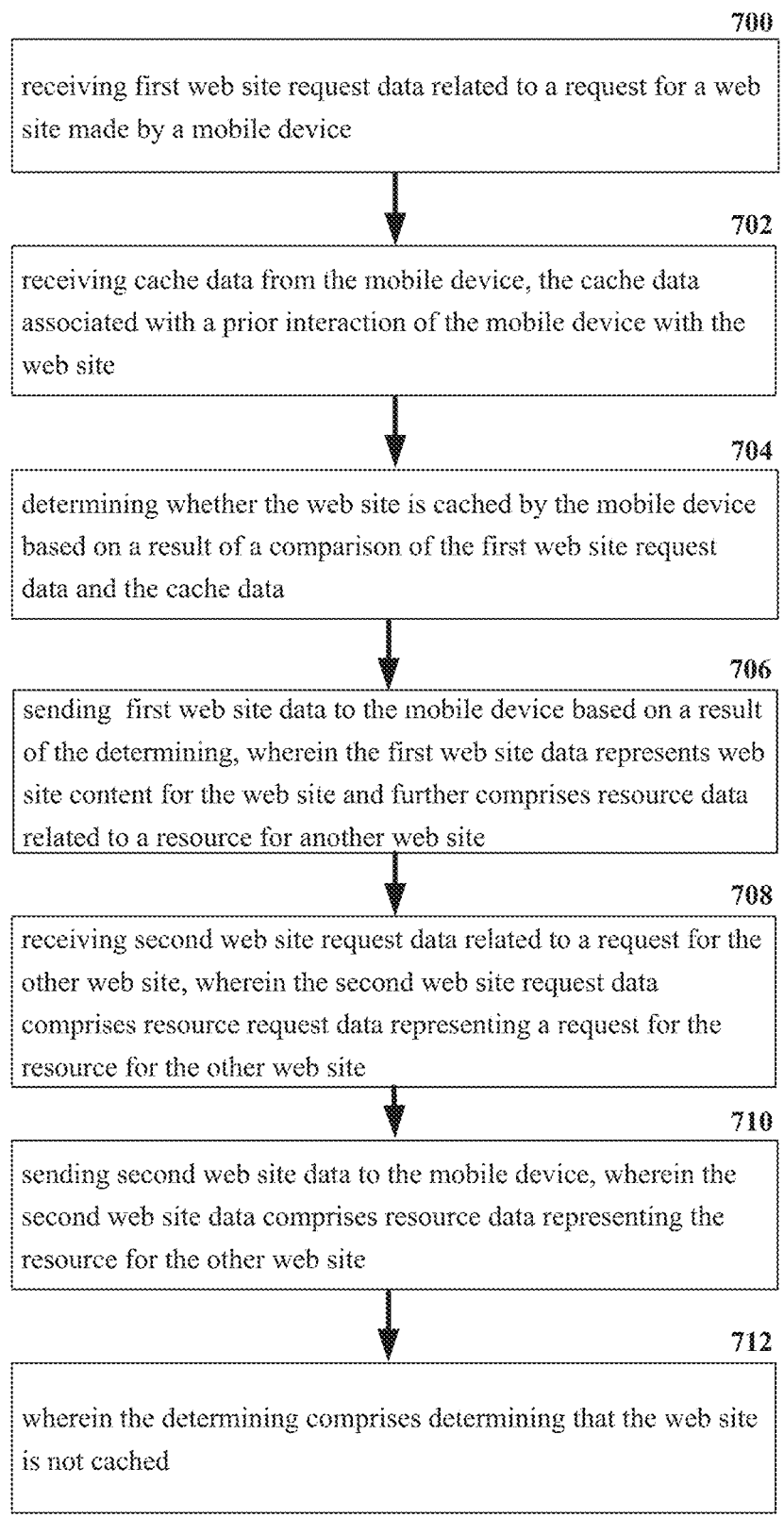
FIG. 7 illustrates an example schematic system block diagram of a client/server communication to reduce web site page load time wherein the web site is not cached according to one or more embodiments.

Referring now to FIG. 7, illustrated is an example schematic system block diagram for of a client/server communication to reduce web site load time wherein the web site is not cached according to one or more embodiments. At element 700, first web site request data related to a request for a web site made by a mobile device can be received by a network device. At element 702 the server device can receive cache data from the mobile device, the cache data associated with a prior interaction of the mobile device with the website. The mobile device can also embed metadata, a list, or data structure related to the cache data into a web site page request. The network device can then determine whether the web site is cached by the mobile device based on a result of a comparison of the first web site request data and the cache data at element 704.

If metadata related to the web site does not exist in a data structure of the request, then the data structure can be considered to be empty. If the data structure is considered to be empty, then the network device can send a response comprising a full push of metadata for the web site, another web site page, and/or subpages unless a limit is set. If the data structure comprises metadata, then the metadata can be representative of IDs or expiration times of the web site and/or subpages whose metadata is cached. Thus, at element 706, first web site data can be sent to the mobile device based on a result of the determining, wherein the first web site data can represent web site content for the web site and can comprise resource data related to a resource for another web site.

At element 708, the network device can receive second web site request data related to a request for the other web site, wherein the second web site request data can comprise resource request data representing a request for the resource for the other web site. Additionally, the network device can send second web site data to the mobile device, wherein the second web site data can comprise resource data representing the resource for the other web site at element 710. Furthermore, the determining can comprise determining that the web site is not cached at element 712.

Figure 8:
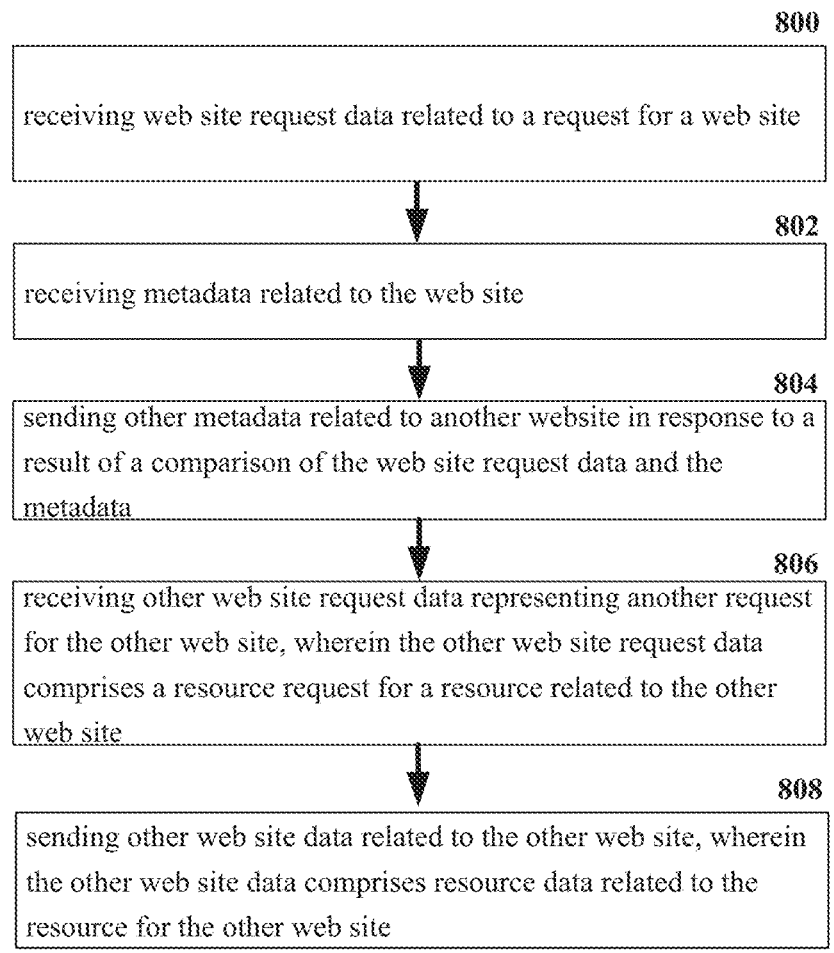
FIG. 8 illustrates an example schematic system block diagram for of a client/server communication comprising a metadata and web site request data comparison to reduce web site load time according to one or more embodiments.

Referring now to FIG. 8, illustrated is an example schematic system block diagram for of a client/server communication comprising a metadata and web site request data comparison to reduce web site load time according to one or more embodiments. At element 800, web site request data related to a request for a web site can be received from a mobile device, and metadata related to the web site can be received from a mobile device at element 802. The mobile device can embed metadata, a list, or data structure into a web site request.

If metadata related to a current page does not exist in a data structure of a web site resource request, then the data structure can be considered to be empty. If the data structure is considered to be empty, then the server device can send a response comprising a full push of metadata for the current page, other pages, and/or its subpages unless a limit is set. If the data structure comprises data, then the data can be representative of IDs or expiration times of the current page and/or subpages whose metadata is cached. Therefore, at element 804, other metadata related to another website can be sent to the mobile device in response to a result of a comparison of the web site request data and the metadata. Additionally, other web site request data representing another request for the other web site, wherein the other web site request data can comprise a resource request for a resource related to the other web site can be received from the mobile device at element 806. Consequently, the system can then send other web site data related to the other web site, wherein the other web site data can comprise resource data related to the resource for the other web site at element 808.

Figure 9:
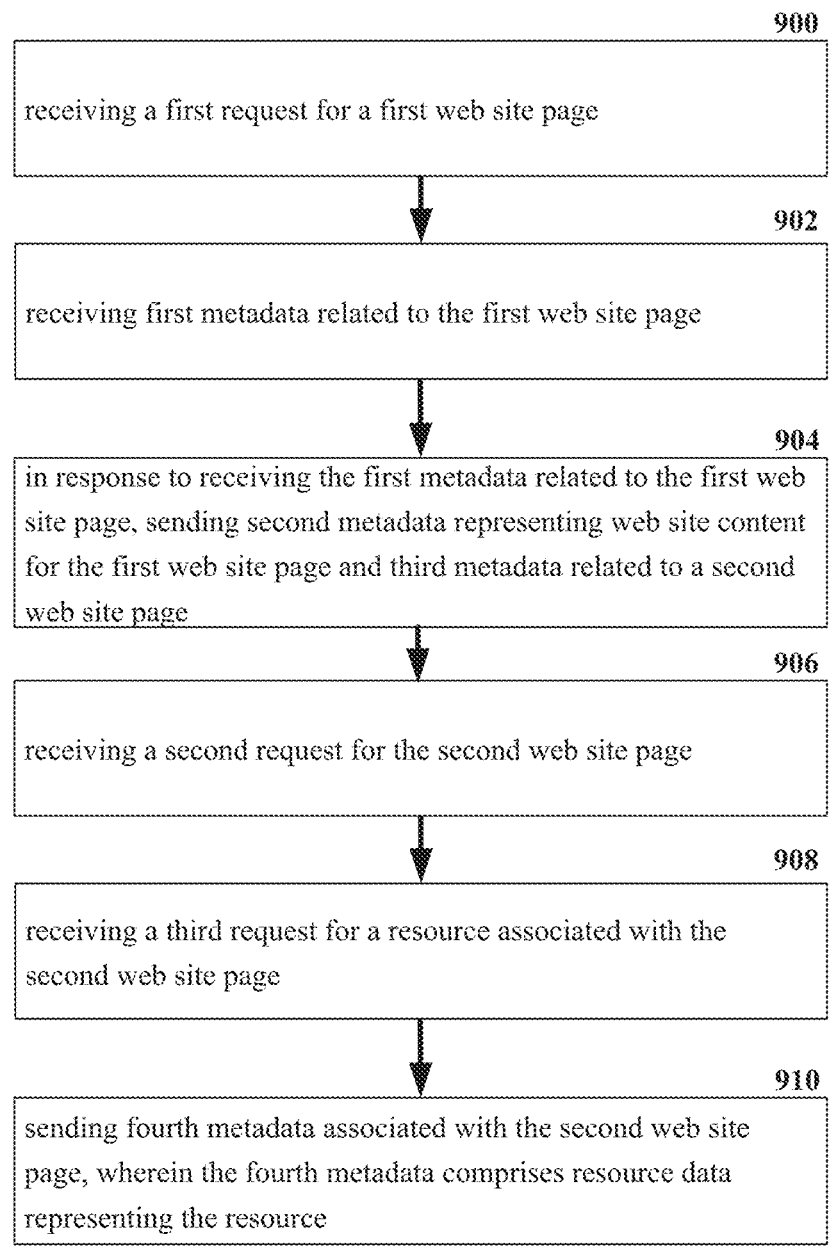
FIG. 9 illustrates an example schematic system block diagram of a client/server communication comprising cached metadata to reduce web site page load time according to one or more embodiments.

Referring now to FIG. 9, illustrated is an example schematic system block diagram of a client/server communication comprising cached metadata to reduce web site load time according to one or more embodiments. At element 900 a computer readable storage device can receive a first request for a first web site page from a mobile device. The mobile device can embed, metadata, a list, or data structure into the first request for the web site page. If metadata related to a current page does not exist in a data structure of the request, then the data structure can be considered to be empty. If the data structure is considered to be empty, then the computer readable storage device can send the response comprising a full push of metadata for the current page, another page, and/or its subpages unless a limit is set. If the data structure comprises metadata, then the data can be representative of IDs or expiration times of the current page and/or subpages whose metadata is cached. Therefore, at element 902, the computer readable storage device can receive first metadata related to the first web site page.

In response to receiving the first metadata related to the first web site page, second metadata representing web site content for the first web site page and third metadata related to a second web site page can be sent to the mobile device at element 904. Thereafter, the computer readable storage device can receive a second request for the second web site page at element 906, and a third request for a resource associated with the second web site page at element 908. Consequently, fourth metadata associated with the second web site page can be sent to the mobile device, wherein the fourth metadata comprises resource data representing the resource at element 910.

Figure 10:
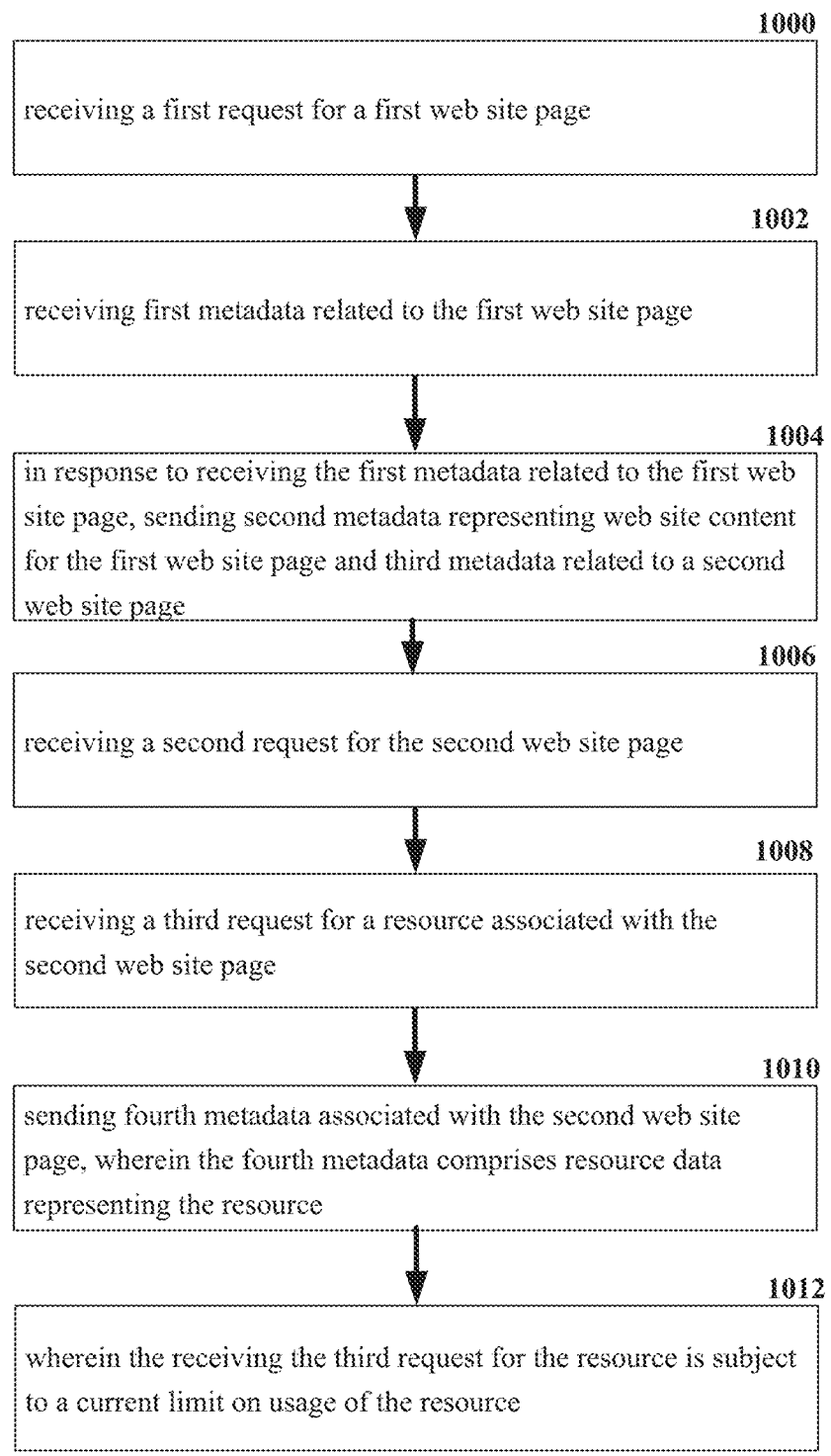
FIG. 10 illustrates an example schematic system block diagram of a client/server communication comprising cached metadata and a resource limit to reduce web site page load time according to one or more embodiments.

Referring now to FIG. 10, illustrated is an example schematic system block diagram for of a client/server communication comprising cached metadata and a resource limit to reduce web site load time according to one or more embodiments. At element 1000 a computer readable storage device can receive a first request for a first web site page from a mobile device. The mobile device can embed, metadata, a list, or data structure into the first request for the web site page. If metadata related to a current page does not exist in a data structure of the request, then the data structure can be considered to be empty. If the data structure is considered to be empty, then the computer readable storage device can send the response comprising a full push of metadata for the current page, another page, and/or its subpages unless a limit is set. If the data structure comprises metadata, then the data can be representative of IDs or expiration times of the current page and/or subpages whose metadata is cached. Therefore, at element 1002, the computer readable storage device can receive first metadata related to the first web site page.

In response to receiving the first metadata related to the first web site page, second metadata representing web site content for the first web site page and third metadata related to a second web site page can be sent to the mobile device at element 1004. Thereafter, the computer readable storage device can receive a second request for the second web site page at element 1006, and a third request for a resource associated with the second web site page at element 1008. Consequently, fourth metadata associated with the second web site page can be sent to the mobile device, wherein the fourth metadata comprises resource data representing the resource at element 1010. Furthermore, the receiving the third request for the resource can be subject to a current limit on the usage of the resource at element 1012. Either the client or the server can apply a limit on the server-pushed metadata.

Figure 11:
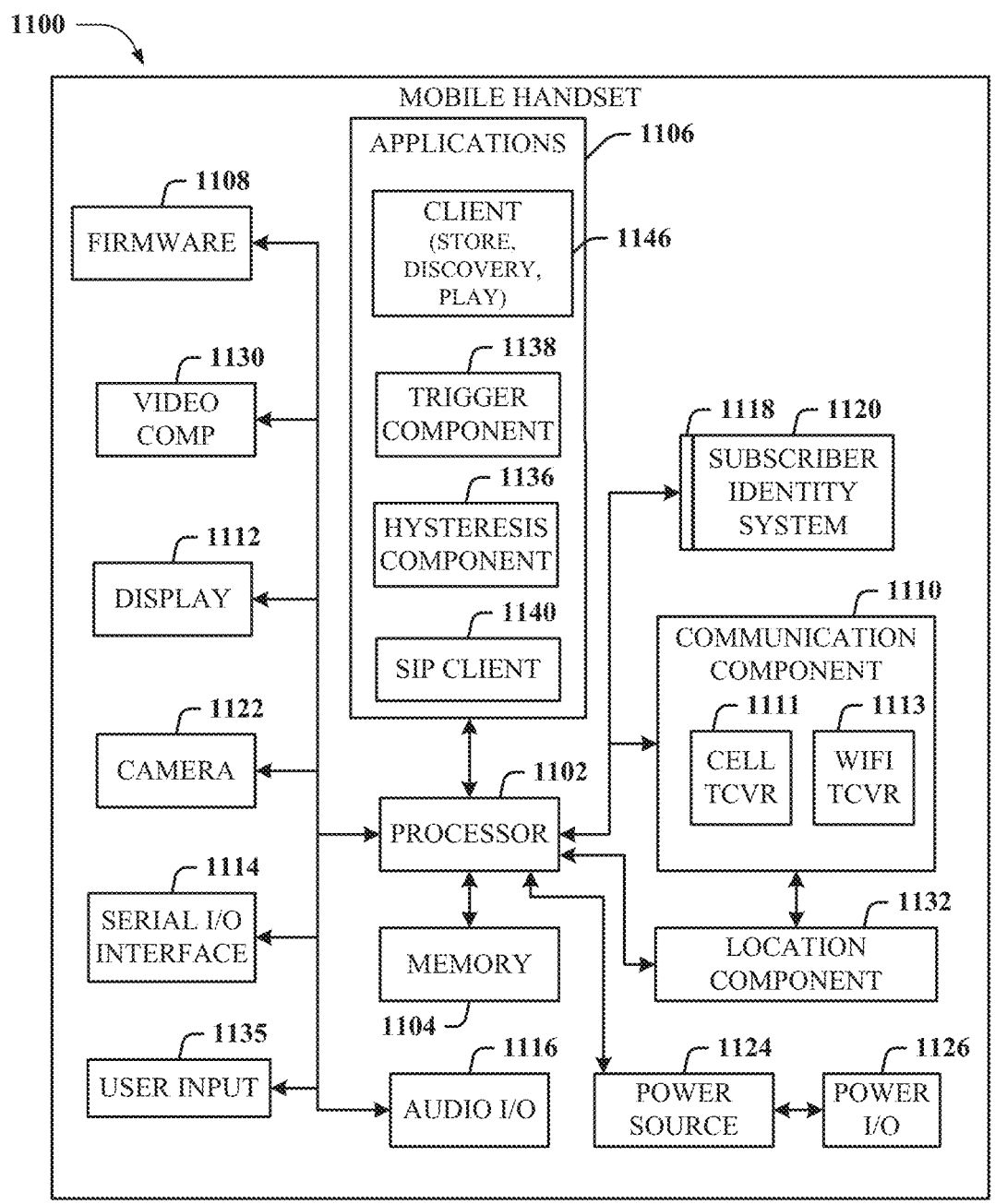
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
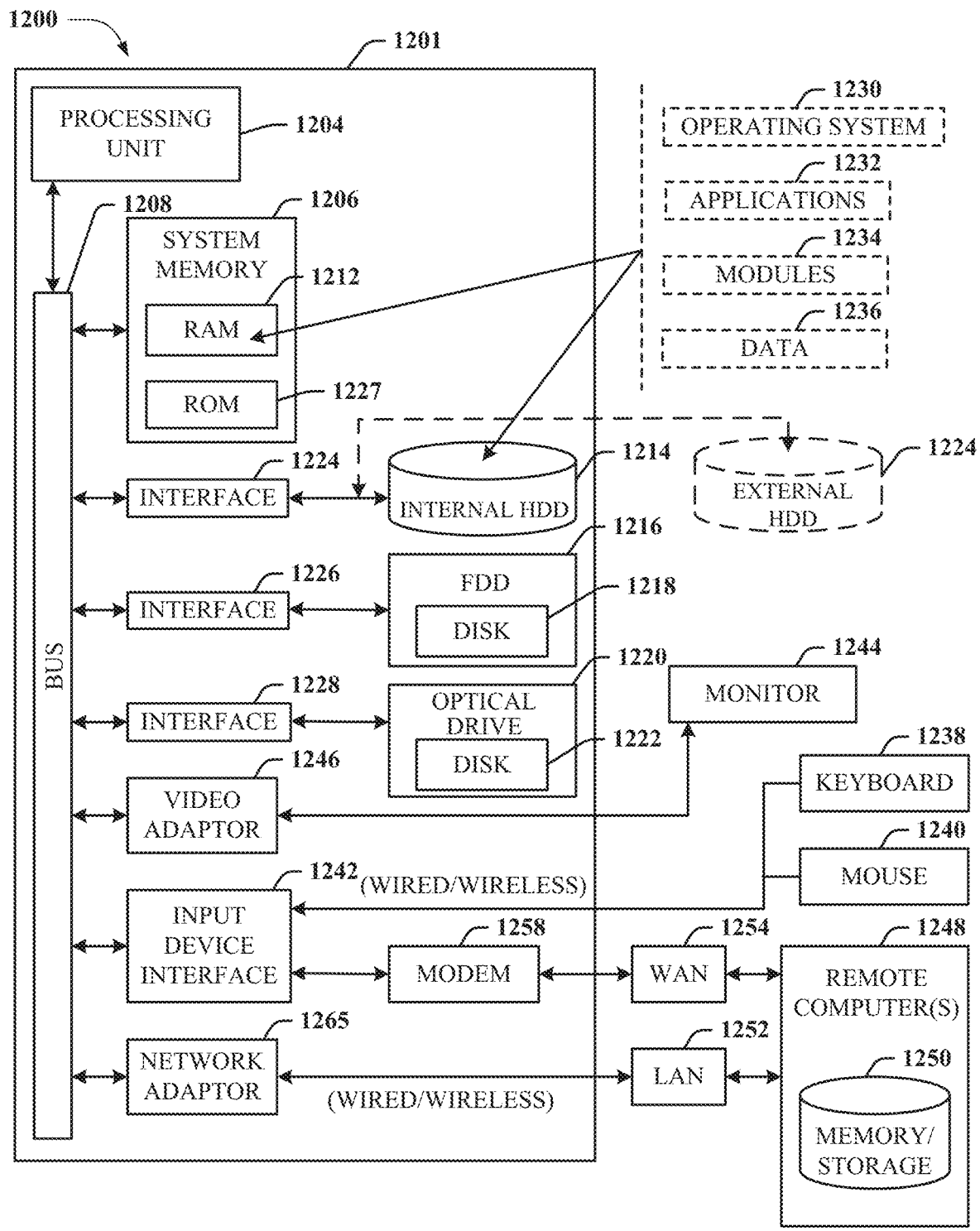
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to sending first resource request data associated with a requested resource for a first web site, receiving, by a user equipment comprising a processor, second web site data, wherein the second web site data represents a universal resource locator associated with a first resource for a second web site;
based on a first result of a comparison of the first resource to a second resource cached by the user equipment, determining, by the user equipment, whether the first resource is cached by the user equipment;
based on a second result of the determining whether the first resource is cached, wherein the second result comprises an indication that the first resource has been determined to have expired, performing, by the user equipment, an action associated with the first resource, wherein the action comprises requesting the first resource for the second web site and sending second resource request data representative of a request for the requested resource;
based on the indication that the first resource has been determined to have expired, sending, by the user equipment to network equipment, cache data indicative of the first resource not being cached;
in response to requesting the first resource, receiving, by the user equipment, notification data representative of a notification that a server is going to generate a data stream comprising the first resource to send to the user equipment, wherein the data stream is different than a current data stream utilized to send the first resource request data;
in response to receiving the notification data, receiving, by the user equipment, first resource data representing the first resource for the second web site, wherein the first resource data comprises expiration data indicative of an expiration time associated with the first resource; and
receiving, by the user equipment, second resource data representative of an unrequested resource, wherein the second resource data is received based on a threshold likelihood of a third resource request from the user equipment.

2. The method of claim 1, wherein the second web site data is metadata received from the server.

3. The method of claim 2, wherein the metadata comprises data stream identification data representative of the data stream to be used by the server to send the first resource for the second web site.

4. The method of claim 1, wherein performing the action comprises performing the action in response to determining that the first resource is not the second resource, and wherein the action comprises requesting the first resource for the second web site.

5. The method of claim 1, wherein the first resource comprises subpage content related to a subpage of the second web site.

6. The method of claim 1, wherein performing the action comprises performing the action in response to determining that the first resource is the second resource, and wherein the action comprises validating that the first resource is an expired resource.

7. The method of claim 1, further comprising:
in response to a browser associated with the user equipment being determined to have been idle, receiving, by the user equipment, the universal resource locator in a response header.

8. A system, comprising:
a processor; and
a memory that stores executable instructions that, when executed by the processor, facilitate performance of operations, comprising:
in response to receiving first resource request data representative of a requested resource for a first web site, wherein the first resource request data comprises first expiration data associated with a first impending expiration of a first resource;
receiving second web site data representative of a universal resource locator associated with the first resource for a second web site;
based on a result of a comparison of the first resource to a second resource cached by a user equipment, wherein the result comprises an indication that the first resource has been determined to have expired, determining that the first resource is not cached by the user equipment;
in response to the determining that the first resource is not cached by the user equipment, sending cache data indicative of the first resource not being cached to network equipment;
sending notification data, representative of a notification of a data stream to be used in connection with sending first resource data to the user equipment, wherein the data stream is different than a current data stream utilized to receive the first resource request data; and
based on determining that the first resource is cached by the user equipment and receiving second resource request data representative of a request for the requested resource, performing an action associated with the first resource, wherein the action comprises sending the first resource data, representative of the first resource, to the user equipment, based on the expiration data, to be utilized for the second web site, wherein the first resource data comprises second expiration data indicative of a second impending expiration of the first resource; and
based on determining that a third resource request is expected to be received from the user equipment with a threshold likelihood, sending second resource data representative of an unrequested resource to the user equipment.

9. The system of claim 8, wherein the operations further comprise:
generating limit data representative of a limit of the first resource for the second web site.

10. The system of claim 9, wherein the operations further comprise:
in response to determining whether there is a specified resource associated with the second web site, sending, to the user equipment, the limit data.

11. The system of claim 9, wherein the limit data is based on a probability determined to be associated with a fourth resource request for the second resource.

12. The system of claim 8, wherein the second web site data is metadata received from a server.

13. The system of claim 8, wherein the web site data comprises stream identification data representative of the data stream to be used by the user equipment.

14. The system of claim 8, wherein performing the action comprises pre-fetching, by a network browser application of the user equipment, the first resource based on the determining that the first resource is cached by the user equipment.

15. A non-transitory machine-readable medium, comprising executable instructions that, when executed by a processor, facilitate performance of operations, comprising:
  sending first resource request data associated with a requested resource for a first web site;
  in response to sending of the first resource request data, receiving second web site data, wherein the second web site data represents a universal resource locator associated with a first resource for the second web site;
  based on a first result of a comparison of the first resource to a second resource cached by a mobile device, determining whether the first resource is cached by the mobile device;
  based on a second result of the determining whether the first resource is cached by the mobile device, wherein the second result comprises an indication that the first resource has been determined to have expired,
    requesting the first resource for the second web site and sending second resource request data representative of a request for the requested resource, and
    sending cache data indicative of the first resource not being cached to network equipment;
  sending notification data representative of a notification that server equipment is carrying out an instruction to send a first data stream comprising the first resource data to the mobile device, wherein the first data stream is different than a second data stream utilized for the first resource request data;
  in response to requesting of the first resource for the second web site, facilitating sending, to the mobile device, first resource data representative of the first resource for the second web site, wherein the first resource data comprises expiration data indicative of an expiration time associated with the first resource for the second web site; and
  sending second resource data representative of an unrequested resource, wherein the second resource data is sent based on a determination that a third resource request is anticipated to be received.

16. The non-transitory machine-readable medium of claim 15, wherein the operations comprise:
  in response to requesting the first resource for the second web site, receiving, by the mobile device, resource data associated with the first resource for the second web site.

17. The non-transitory machine-readable medium of claim 15, wherein the first resource is subpage content related to a subpage of the second web site.

18. The non-transitory machine-readable medium of claim 15, wherein the first resource is subpage content related to an expired subpage of the second web site.

19. The non-transitory machine-readable medium of claim 15, wherein an availability to use the first resource is weighted based on a defined priority ranking for the first resource.

20. The non-transitory machine-readable medium of claim 15, wherein the second web site data is metadata received from the server equipment.

* * * * *